J. LOOSE.
FLEXIBLE COUPLING.
APPLICATION FILED FEB. 16, 1915.
1,150,441.
Patented Aug. 17, 1915.
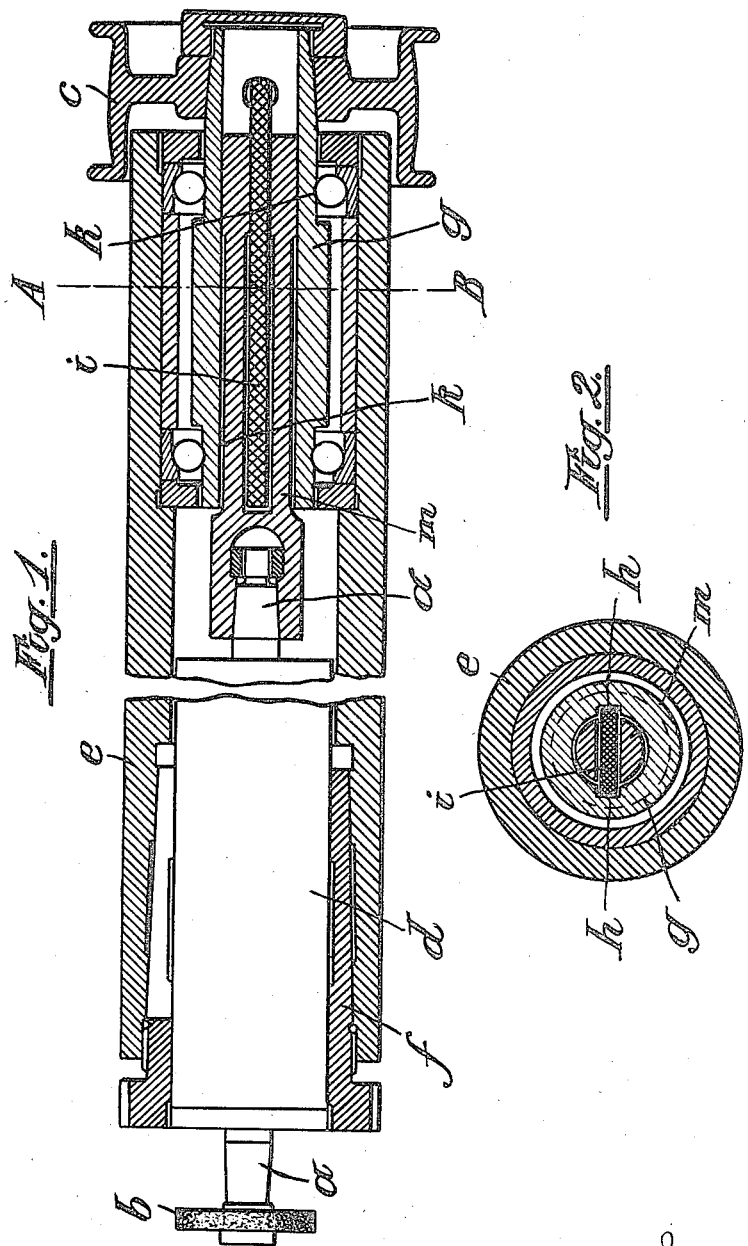
Witnesses:
Elsie Swenson
Arthur Benson
Inventor:
Johannes Loose
By Munn & Bros
Attorneys

UNITED STATES PATENT OFFICE.

JOHANNES LOOSE, OF STUTTGART-CANNSTATT, GERMANY, ASSIGNOR TO FORTUNA-WERKE, SPECIALMASCHINENFABRIK, G. M. B. H., OF STUTTGART-CANNSTATT, GERMANY.

FLEXIBLE COUPLING.

1,150,441.   Specification of Letters Patent.   Patented Aug. 17, 1915.

Application filed February 16, 1915. Serial No. 8,696.

*To all whom it may concern:*

Be it known that I, JOHANNES LOOSE, of 31 Karlstrasse, Stuttgart-Cannstatt, in the Kingdom of Wurttemberg, German Empire, civil engineer, have invented certain new and useful Improvements in Flexible Couplings, of which the following is a specification.

My invention relates to flexible couplings and its object is to provide a coupling especially adapted for use in high speed machinery which is applicable to shafts of a very small diameter, which allows the shafts coupled with each other to execute independent longitudinal movements of a certain length.

According to my invention, a simple key or strip of leather or similar material which is both tough and elastic, is employed as the coupling means proper, said key or strip being preferably inserted in a slot at the end of one shaft and longitudinal grooves provided on the inside of an axial recess at the end of the other shaft, the slotted end of the first mentioned shaft being inserted in the hollow end of the other shaft.

In the drawings accompanying this specification my invention is shown as applied to the spindle of a grinding or cutting machine.

Figure 1 is a longitudinal section, and Fig. 2 is a cross section on the line A—B (Fig. 1) of such a machine.

*a* is a grinding wheel spindle, *b* is the grinding wheel, *c* is the pulley driven by a belt (not shown) and designed to drive shaft *a* by the medium of an intermediate shaft *g*, it being imperative to transmit power from said pulley to shaft *a* without transmitting any vibrations created in the driving gear and liable to disturb the grinding operation. Moreover it is sometimes desirable to cut or grind notches or the like in the material to be worked, and inasmuch as these notches in some cases must be definitely limited in size and position, the grinding wheel should always rotate truly with respect to a definite place of grinding. To this end the spindle *a* is located in a well known manner within a special bearing sleeve *d* capable of being shifted axially within an outer sleeve *e* and of being fixed therein by aid of a slotted cone provided with screw-threads and screwed into the open end of sleeve *e*. Intermediate shaft *g* is hollow and two longitudinal notches *h* are provided in its inner wall, said notches being arranged diametrically opposite each other. A rectangular leather key *i* is inserted at its edges into the notches *h* and is embraced on both sides by a bifurcated coupling piece *m* rigidly coupled at its other end with the spindle *a*. By providing a removable connection between piece *m* and spindle *a* the spindle and sleeve *d* can easily be replaced by different parts. The hollow shaft *g* preferably runs in ball bearings *k* provided within sleeve *e*. Preferably also only the free end of the bifurcated coupling piece *m* fits tightly between the hollow shaft *g* and the leather key *i*, while in the other places there is some space left between it and the shaft and key respectively.

It is clear from the foregoing that besides avoiding the transmission of vibrations from the driving pulley to the driven shaft the new coupling also affords the possibility of moving the grinding wheel shaft longitudinally quite a long distance within the outer sleeve *e* without severing the driving connection. Moreover slight inequalities in the co-axial position of the bearings are balanced automatically.

The term "leather" used in this specification and in the claims is understood to include also all tough and elastic materials other than leather.

I claim:

1. In a device of the character described, an outer sleeve, an inner sleeve adjustable endwise in said outer sleeve, a slotted cone interposed between said inner and outer sleeves for locking the inner sleeve to said outer sleeve, longitudinally spaced bearings in said outer sleeve, a hollow shaft journaled therein, a spindle in said inner sleeve, and means for connecting said shaft to said spindle.

2. In a device of the character described, an outer sleeve, an inner sleeve adjustable endwise in said outer sleeve, a slotted cone interposed between said inner and outer sleeves for locking the inner sleeve to said outer sleeve, longitudinally spaced bearings in said outer sleeve, a hollow shaft journaled therein, a spindle in said inner sleeve, and means for connecting said shaft to said spindle, said connecting means including a splined connection between said shaft and spindle.

3. In a device of the character described, in combination, a driving shaft, a shaft to be driven, one of said shafts being hollow, longitudinal grooves in the hollow of said shaft, a bifurcated connecting piece inserted in said hollow shaft and connected with the other shaft and a leather key inserted in said bifurcated connecting piece and projecting into said grooves of said hollow shaft.

4. In a device of the character described, in combination, a hollow driving shaft, an outer sleeve surrounding said shaft, another shaft within said sleeve adapted to be driven by said driving shaft, a bearing sleeve surrounding said other shaft and removably fixed within said outer sleeve, ball bearings between said sleeve and the driving shaft, a bifurcated connecting piece fixed to the driving shaft and inserted in the hollow driving shaft, longitudinal grooves in the inner wall of said driving shaft and a leather key inserted in said bifurcated piece and in the grooves of said driving shaft.

In testimony whereof, I affix my signature, in presence of two witnesses.

JOHANNES LOOSE.

Witnesses:
   ANTON ARETZ,
   ERNEST ENTENMANN.